Figure 1:
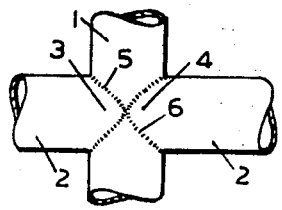

Sept. 17, 1963     I. P. CRUSON     3,103,742
METHOD FOR MAKING A SEATING ON A TUBE
Filed Feb. 19, 1957     4 Sheets-Sheet 1

IZAAK PIETER CRUSON
INVENTOR.

BY
ATTORNEY

Sept. 17, 1963        I. P. CRUSON        3,103,742

METHOD FOR MAKING A SEATING ON A TUBE

Filed Feb. 19, 1957        4 Sheets-Sheet 2

IZAAK PIETER CRUSON
INVENTOR.

BY

ATTORNEY.

Sept. 17, 1963  I. P. CRUSON  3,103,742
METHOD FOR MAKING A SEATING ON A TUBE
Filed Feb. 19, 1957  4 Sheets-Sheet 3

IZAAK PIETER CRUSON
INVENTOR.
BY
ATTORNEY

FIG: 21.
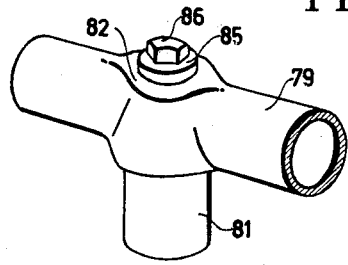
FIG: 22.
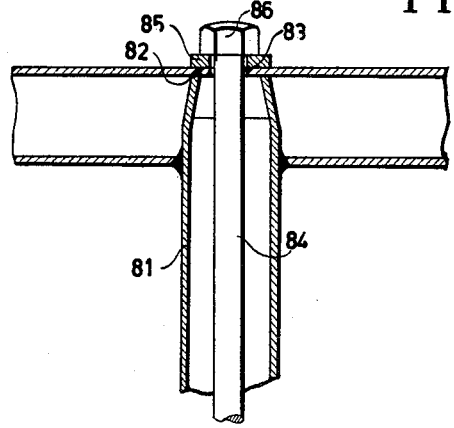
FIG: 23.
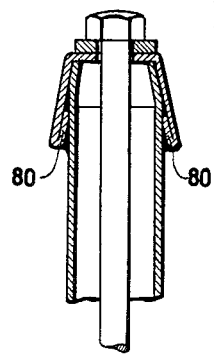

United States Patent Office 3,103,742
Patented Sept. 17, 1963

3,103,742
METHOD FOR MAKING A SEATING
ON A TUBE
Izaak Pieter Cruson, Breskens, Netherlands, assignor, by mesne assignments, to Cruson Patents N.V., Curacao, Netherlands Antilles, a Dutch corporation
Filed Feb. 19, 1957, Ser. No. 641,221
Claims priority, application Netherlands Feb. 29, 1956
3 Claims. (Cl. 29—482)

This invention relates to a method for forming a seat on a tube in order to provide a joint between that tube and another tube or rail crossing the first tube and preferably having a circular, oval or other curved cross-sectional shape.

Heretofore, a seat provided at a joint between intersecting tubes has usually been formed by cutting one tube at the location of its intersection with the other tube to form end edges which will fit closely against the other tube at the intersection, whereupon the end edges of the cut tube are welded to the surface of the other intersecting tube. However, cutting away one of the intersecting tubes in order to form the necessary seat for the other tube reduces the amount of material at the intersection, and thereby weakens the joint between the intersecting tubes.

Accordingly, it is an object of this invention to provide a method whereby one of the intersecting tubes is preformed to define an arcuate seat which receives the other tube crossing the preformed tube, and which facilitates the provision of a solid joint between the intersecting tubes, while avoiding cutting away of the material of either tube at the joint.

According to an aspect of the invention, the wall of one of the intersecting tubes is forced outwardly to form a seat having a longituidnal axis which crosses the tube axis and which has a shape corresponding to the shape of the other one of the intersecting tubes. Since the seat formed by pressing the wall of one of the tubes corresponds to the shape of the other intersecting tube, the intersecting tubes have parallel wall surfaces in the region of the joint therebetween, thereby providing a relatively large area of contact between the surfaces of the intersecting tubes at the joint for more rigid relative positioning of the tubes and, in the case of a welded joint, a relatively large surface at which welding may be effected.

The wall of the preformed tube can be pressed to form seats at various locations along the length thereof where the preformed tube is to be connected with other intersecting tubes, as in the manufacture of a tubular frame, whereby considerable savings in labor may be achieved.

In accordance with a preferred embodiment of this invention, two cylindrical intersecting rails, at least one of which is tubular, are interconnected by placing a tubular rail in a corresponding semi-cylindrical cavity of a die with both ends of the tubular rail protruding from the die, the die further having a second semi-cylindrical cavity with the center line of the latter intersecting the center line of the first mentioned cavity at an angle corresponding to the angle between the two rails to be interconnected, the bottom of said second cavity, at the part thereof intersecting the first mentioned cavity, being situated lower than the first cavity, pressing a die stamp into the second cavity toward the bottom of the latter to press together the wall of the tubular rail and form a double-walled part which is forced outwardly with respect to the original cross-section of the tubular rail against the inner wall of the second cavity and thereby forms a double-walled seat, removing the die stamp, then placing the other intersecting rail into the double-walled seat formed by the die stamp in the tubular rail, and securing the rails to each other in the contact area therebetween.

Figure 2:
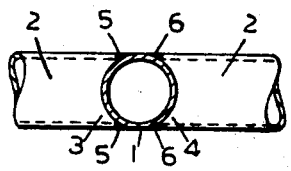
Figure 3:
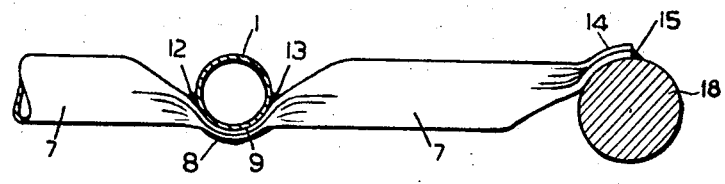
Figure 4:
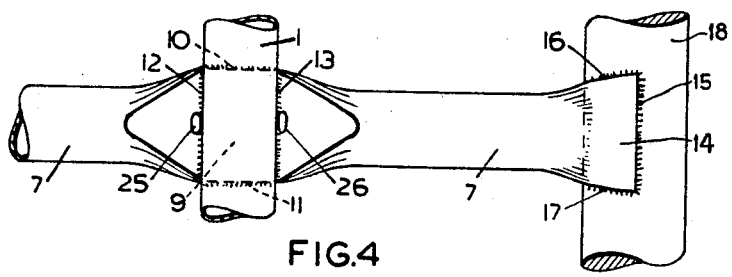
Figure 5:
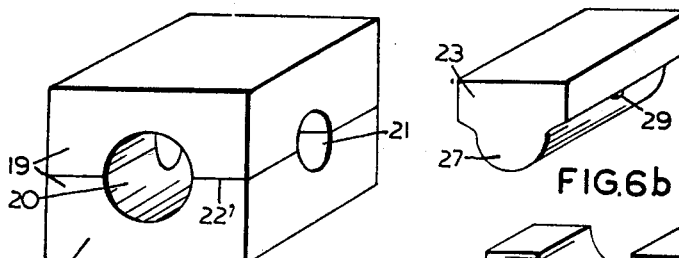
Figure 6A:
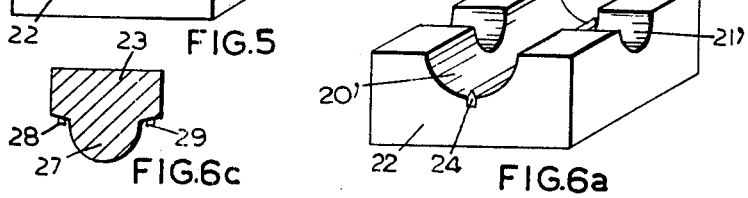
Figure 6C:
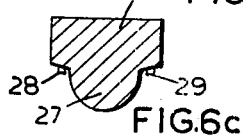
Figure 7:
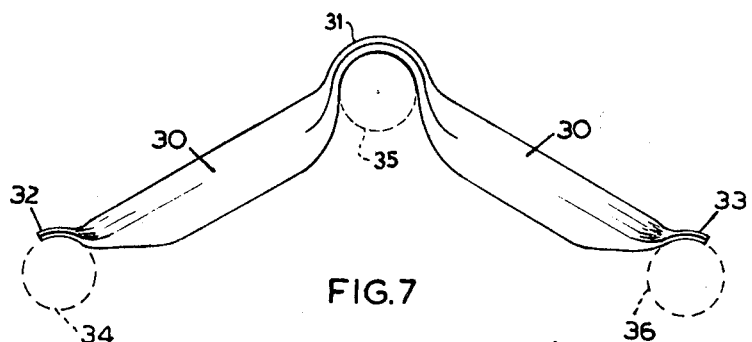
Figures 8, 10:
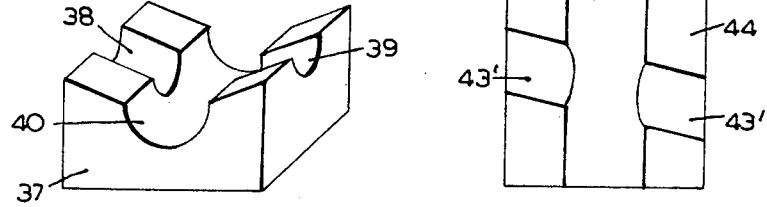
Figure 9:
Figures 11, 12:
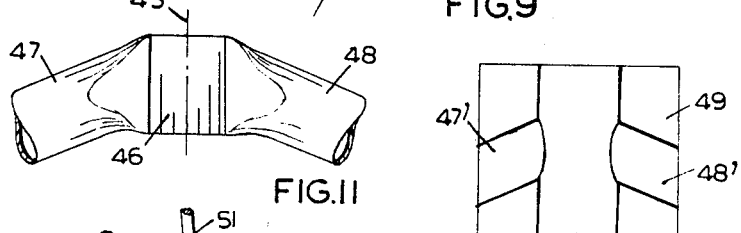
Figure 13:
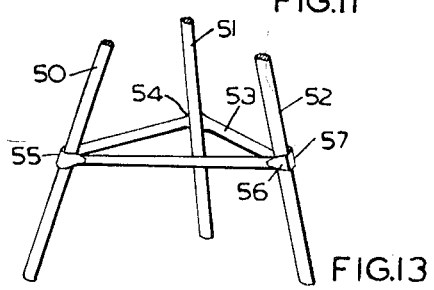
Figure 16:
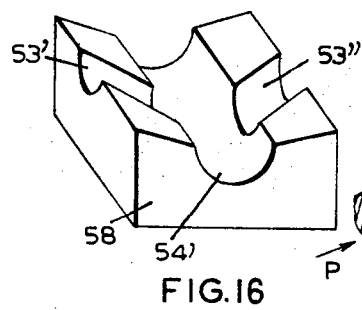
Figure 17:
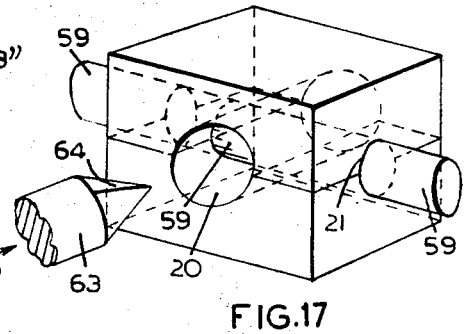
Figure 18:
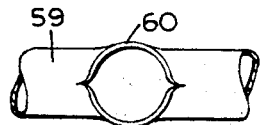
Figure 14:
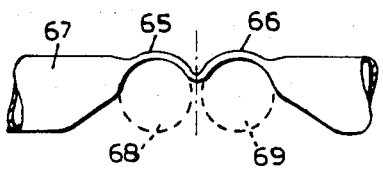
Figure 19:
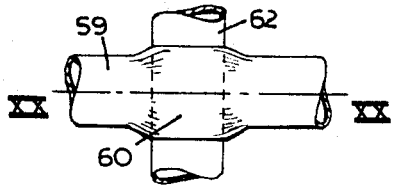
Figure 20:
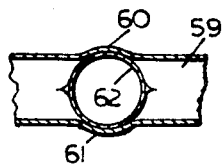
Figure 15:
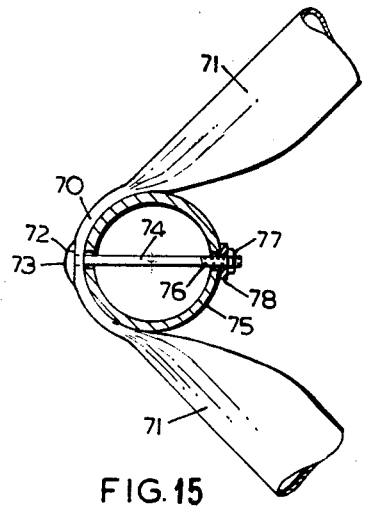

The above, and other objects, features and advantages of the invention, will be apparent in the following detailed description of illustrative embodiments thereof which is to be read in connection with the accompanying drawings, forming a part hereof, and wherein:

FIG. 1 is a plan view of a joint between intersecting tubes produced by a previously known method;
FIG. 2 is an end elevational view of the joint of FIG. 1;
FIG. 3 is an end elevational view, partly in section, illustrating joints between a tubular rail and intersecting cylindrical rails in accordance with a first embodiment of this invention;
FIG. 4 is a plan view of the structure shown on FIG. 3;
FIG. 5 is a perspective view of a die used in connection with the method embodying this invention;
FIG. 6a is a perspective view of a female die used in connection with the method embodying this invention;
FIG. 6b is a perspective view of a male die for use with the female die of FIG. 6a;
FIG. 6c is a transverse cross-sectional view of the male die of FIG. 6b;
FIG. 7 is a side elevational view of a tube formed with several seats in accordance with the invention and having the portions of the tube between the seats disposed at angles with respect to each other;
FIG. 8 is a perspective view of a die to be used in preforming the tube of FIG. 7;
FIG. 9 is a perspective view of a tube formed with a seat in accordance with the present invention, which seat has its axis directed obliquely with respect to the axis of the tube;
FIG. 10 is a diagrammatic plan view of a die to be used in forming the seat shown on the tube of FIG. 9;
FIG. 11 is a plan view of a tube formed with a seat in accordance with this invention and wherein the portions of the tube at the opposite sides of the seat have their axes angularly related with respect to each other and lying in a plane which is parallel to the axis of the seat;
FIG. 12 is a diagrammatic plan view of a die to be used in forming a tube with a seat of the kind shown on FIG. 11;
FIG. 13 is a perspective view of a portion of a furniture frame formed of metal tubes which are joined together in accordance with the method embodying this invention;
FIG. 14 is a side elevational view of a tube formed with a double seat in accordance with this invention so that the double seat can be cut in the middle to define seats at the ends of two separate tube lengths;
FIG. 15 is an elevational view, partly in section, of a separable joint between intersecting tubes, one of which is formed with a seat in accordance with this invention;
FIG. 16 is a perspective view of a die for forming a seat on a tube, as required in the construction of the frame illustrated on FIG. 13;
FIG. 17 is a diagrammatic perspective view of a die and punch to be used in accordance with another embodiment of this invention;
FIG. 18 is a side elevational view of a tube formed with a seat through the use of the die and punch of FIG. 17;
FIG. 19 is a plan view of a joint between a tube of the kind illustrated by FIG. 18 and an intersecting tube;
FIG. 20 is a sectional view taken along the line XX—XX on FIG. 19;
FIG. 21 is a perspective view of a joint or connection for a bicycle handle bar produced in accordance with this invention;

FIG. 22 is a longitudinal sectional view of the joint or connection illustrated on FIG. 21; and FIG. 23 is a transverse sectional view of the joint according to FIG. 21.

Referring now to FIG. 1, it will be seen that, in forming a joint between intersecting tubes 1 and 2, it has been the usual practice to cut or interrupt the tube 2 along the lines of its intersection with the tube 1, and then to separately join the end edges of the two portions 3 and 4 of the interrupted tube 2 to the tube 1, as by the welded seams 5 and 6. In order to obtain a solid joint, the edges of the portions 3 and 4 of tube 2 must be cut to conform to the lines of intersection of the cylindrical shape of tube 2 with the cylindrical shape of the intersecting tube 1. Apart from the obvious difficulty encountered in cutting the end edges of the tube portions 3 and 4 so as to conform accurately to the shape of the surface of tube 1, it will be apparent that the cut edges of the two portions of tube 2 have only a relatively small area of contact with the surface of tube 1, and hence a relatively weak joint is obtained. The difficulty encountered in accurately cutting the edges of the portions 3 and 4 of tube 2 is even more acute when the tubes 1 and 2 do not intersect at right angles, or when the axes of the tubes to be connected do not intersect, but rather are offset with respect to each other.

Referring now to FIGS. 3 and 4, it will be seen that, in accordance with the present invention, a joint between intersecting tubes 1 and 7 is produced by forcing outwardly the wall of the tube 7 at the location of the joint of the latter with the tube 1 so that a seat 9 is formed in the tube 7, which seat corresponds to the shape of the outer wall surface of the tube 1 at the joint. The seat 9 is preformed merely by a pressing operation which can be performed in a relatively simple die, as explained hereinafter, and the tube 7 is not cut away or interrupted in forming the seat 9. Further, close contact is obtained between a relatively large area of the surface of the tube 7, at the seat 9, and the outer wall surface of the tube 1, thereby rigidly positioning the tubes with respect to each other. Although the tubes may be welded together along both outer rims of the seat 9, as indicated in broken lines at 10 and 11 on FIG. 4, the tubes may be also welded together along the lines 12 and 13 (FIGS. 3 and 4) with the weld material penetrating the clearance between the sides of the seat 9 and the outer surface of tube 1 to provide a welded joint therebetween over a relatively large surface.

It will be apparent that, in the embodiment of the invention illustrated on FIGS. 3 and 4, the seat 9 formed in tube 7 at the location of the joint is double-walled, as the parts of the wall 7 which were originally disposed diametrically across from each other have been forced together and outwardly with respect to the tube axis during the forming of the seat.

Further, as shown on FIGS. 3 and 4, the end of tube 7 may be formed with a seat 14 for connecting the end of the tube with an intersecting cylindrical rail or tube 18 merely by cutting a preformed, substantially semi-cylindrical seat similar to the seat 9 through the middle thereof. Thereafter, the end of tube 7 can be secured to cylindrical rail or tube 18 by welding along the end edge or rim 15 or the seat 14, and also along the opposite sides thereof, as at 16 and 17. In order to illustrate various applications of the invention, the tube or rail 18 engaged by the seat 14 is shown as a solid member having its axis disposed below a horizontal plane passing through the axis of tube 7.

As shown on FIG. 5, dies for forming seats in accordance with the present invention may be obtained by forming a metal block 19 with bores 20 and 21 extending therethrough. In the arrangement illustrated by FIG. 5, the bores 20 and 21 extend at right angles to each other and have intersecting axes, with the bore 20 having a diameter greater than the diameter of the bore 21. After the bores 20 and 21 are formed in the block 19, the latter is cut in half at the plane 22' which includes the axes of the bores 20 and 21. Each of the halves of the block 19 thus forms a female die 22 as illustrated in FIG. 6a. Each female die 22 has cavities 20' and 21' which intersect each other, with the bottom of the cavity 20' being lower than the bottom of the cavity 21'. A male die 23 (FIG. 6b) is employed in connection with the female die 22 for forming the seat 9 in the tube 7. The male die 23 has a generally semi-cylindrical contoured portion 27 at its underside, with the contour of the portion 27 generally corresponding to the shape of the outer surface of the tube 1 to be received in the seat 9.

When forming the seat 9 in the tube 7, the latter is placed in the cavity 21' and the male die 23 is pressed downwardly against the tube 7 with the axis of the contoured portion 27 of the male die being aligned with the axis of the cavity 20' of the female die 22. Thus, the contoured portion 27 of male die 23 forces the tube 7 into the cavity 20' to form the seat 9 in the tube, as shown on FIGS. 3 and 4. Since the bottom of cavity 20' is lower than the bottom of cavity 21', the portion of the tube 7 acted upon by the contoured portion 27 of male die 23 is pressed downwardly beyond the outer periphery of the normal contours of tube 7, as at 8 on FIG. 3. If the tubes 1 and 7 normally have the same diameter, and it is desired to connect such tubes with their axes in intersecting relationship, then the bottom of cavity 20' is made lower than the bottom of cavity 21' by a distance equal to twice the thickness of the wall of tube 7 so that tangents to the bottom of the seat 9 and to the bottom of the tube 7 at undeformed portions of the latter will lie in the same plane.

If it is desired to form half a seat, as at 14 on FIGS. 3 and 4, a longitudinally extending knife 24 is provided at the bottom of cavity 20' of female die 22 to cut the tube 7 at the same time as the latter is formed with a seat by the downward pressing action of the male die 23. Thus, the tube 7 will be cut into two lengths with half a seat 14 being formed at the ends of the tube lengths. When a complete or uninterrupted seat is to be formed, as at 9 on FIGS. 3 and 4, the knife 24 is removed from the female die.

As shown on FIG. 4, the seat 9 formed in the tube 7 may be provided with holes 25 and 26 at the opposite sides of the seat, which holes extend only through the tube wall contacted by the intersecting tube 1. The holes 25 and 26 communicate with the interior of the tube 7 and are useful in permitting welding waste to flow off so that a better weld may be obtained, and also in providing access from the exterior to the interior of the tube 7, as may be desirable when treating the formed tube 7 in plating or other baths.

As shown particularly on FIG. 6c, punching dies 28 and 29 may be secured on the lower face of the male die 23 at the opposite sides of the contoured portion 27 thereof for the purpose of forming the holes 25 and 26 simultaneously with the forming of the seat 9 by the contoured portion 27.

Referring now to FIG. 7, it will be seen that the tube 30 there illustrated is formed with a seat 31 at its center, while the portions of the tube at opposite sides of the seat 31 are arranged with their axes including an obtuse angle. Further, the axis of the seat 31 extends perpendicular to the plane including the axes of the parts of the tube 30 at opposite sides of the seat 31, while the ends of the tube 30 are formed with half seats 32 and 33 which are similar to the seat 14 described above with respect to FIGS. 3 and 4. The tube 30 can be employed in a frame which further includes three parallel tubes or rods 34, 35 and 36, represented by broken lines on FIG. 7, which are received in the seats 32, 31 and 33, respectively, and connected together by the tube 30.

The seat 31 may be formed in the tube 30 while the parts of the latter at the opposite sides of the seat are simultaneously disposed to include an obtuse angle through use of the die 37 illustrated on FIG. 8. The die 37 has two supporting seats or cavities 38 and 39 arranged with their axes converging downwardly at an obtuse angle and a forming cavity 40 having its axis extending perpendicular to the plane including the axes of cavities 38 and 39. Further, the bottom of the cavity 40 extends below the cavities 38 and 39. The straight tube is placed in the supporting cavities 38 and 39 and a male die (not shown) having a contour corresponding to that of the tube 35 to be received by the seat 31 is pressed downwardly toward the forming cavity 40. The pressure of the male die initially bends the tube to the angle included between the axes of the cavities 38 and 39 and then forms the tube to the shape of the cavity 40.

In each previously described tube 30, the axis of the formed seat 31 extends perpendicular to the plane including the axes of the parts of the tube at the opposite sides of the seat. However, as shown on FIG. 9, the method embodying this invention may be employed to form a seat 41 in a tube 43 with the axis 42 of the seat being obliquely disposed relative to the axis of the tube, that is, with the axis 42 of the seat at an angle other than 90° with respect to the axis of tube 43. The seat 41 of the tube 43 illustrated on FIG. 9 may be formed in a die 44 (FIG. 10) having a supporting cavity 43' for the tube 43 which is directed obliquely with respect to the forming cavity 41'. As shown on FIG. 11, the axis 45 of a seat 46 formed in accordance with the present invention may be in the plane including the axes of the parts 47 and 48 of the tube at the opposite sides of the seat, while the axes of the tube parts 47 and 48 include an obtuse angle. As shown on FIG. 12, the female die 49 for forming the seat 46 of FIG. 11 is provided with supporting cavities 47' and 48' having axes including an obtuse angle, and a forming cavity 46' located between the cavities 47' and 48' and arranged with its axis extending parallel to the plane including the axes of the cavities 47' and 48'.

Referring now to FIG. 13, it will be seen that joints or connections embodying the present invention may be provided between metal tubes which are assembled together to form a tripod base or frame for a stool or other article of furniture. The illustrated frame includes three legs 50, 51 and 52 which converge upwardly and which are joined together by a tube 53 formed, intermediate its ends, with seats 54 and 55 for receiving the legs 51 and 50, respectively, while the ends of the tube 53 are formed with half seats 56 and 57 which are brought together to grasp or receive the leg 52. Since the legs 50, 51 and 52 converge upwardly, and since the parts of the tube 53 between the seats must finally define the sides of a triangle, the axis of each of the seats 54, 55, 56 and 57 is disposed at an angle other than 90° with respect to the plane of the axes of the parts of the tube at opposite sides of the seat, which axes include an angle of 60°.

The seats 54, 55, 56 and 57 may be formed in the tube 53 in a die 58 (FIG. 16) having supporting cavities 53' and 53" arranged with their axes including an angle of 60° and lying in a plane which is inclined with respect to the axis of the forming cavity 54'.

It will be apparent that the female dies illustrated in FIGS. 8, 10, 12 and 16 are preferably used in connection with upper female dies (not shown) arranged above the supporting cavities of the lower female dies, so that the positioning of the tube, in which a seat is formed, is also positively determined in the upward direction.

Referring now to FIG. 14, it will be seen that, in accordance with the present invention, two side-by-side seats 65 and 66 may be formed in a tube 67 for the connection of the latter with two tubes, rods, or rails 68 and 69 having circular cross-sections and which extend parallel to each other in closely adjacent relationship, as indicated by broken lines.

The method embodying this invention is not only advantageously useful in the manufacture of completed frames from metal tubing, for example, in the manufacture of metal furniture, supporting framework and the like, but may also be employed to provide individually marketed or sold metal tubes with preformed seats by which such tubes may be connected by the purchaser to other metal tubes.

When the metal tubes are to be joined together by the user, as indicated above, the welding together of the tubes at the joints is not feasible, as the user probably will not have access to welding equipment. Thus, in accordance with the present invention, a tube having a seat preformed therein may be connected to another tube received in the seat by simple securing means, other than welding. More specifically, the seat 70 formed in the tube 71 in accordance with the present invention has a small flat surface 72 located at the center of the outer wall surface of the seat 70, and the latter is formed with a hole extending therethrough concentric with the flat surface 72. Thus, the head 73 of a bolt 74 extending through the hole formed in the seat 70 may rest against the flat surface 72, and the bolt 74 may further extend through diametrically opposed openings formed in the tube 75 which is to be secured in seat 70. The threaded end 76 of bolt 74 projects from the tube 75 and receives a nut 77 and a washer 78 which is interposed between the nut 77 and the tube 75 and preferably has a surface conforming to the outer contour of the tube 75.

When forming a seat in a welded tube, that is, a tube having a longitudinal weld seam, such tube should be placed in the supporting cavity of the female die, for example, in the cavity 21' of the die 22 on FIG. 6a, with the longitudinal seam at the top of the tube so that such seam will be located inside the seat formed in the tube.

In all of the previously described embodiments of the invention, the double-walled seat formed in the tube has both walls of the seat pressed together at one side of the axis of the tube so that the seat opens toward the other side of the axis of the tube. However, in accordance with a modification of this invention, as shown on FIGS. 18, 19 and 20, a tube 59 may be formed with a double-walled seat in which the walls defining the seat are pressed in opposite directions, as at 60 and 61, to receive a tube 62 therebetween. It will be apparent that the double-walled seat 60—61 forms a closed passage through which the tube 62 may be extended. The seat illustrated by FIGS. 18, 19 and 20 may be formed in the tube 59 through the use of the die arrangement illustrated on FIG. 17. The die arrangement of FIG. 17 includes female dies formed in the manner described above with reference to FIG. 5 so that the supporting cavity 21 for the tube 59 and the forming cavity 20 are in the form of intersecting bores. The tube 59 is pierced and formed by means of a pointed male die 63 having a sharp or chiselled end 64. The cylindrical portion of the male die 63 corresponds to the shape of the outer surface of the tube 62 with which the tube 59 is to be connected. The male die 63 is driven axially through the cavity 20 in the direction of the arrow P so that the tube 59 is initially penetrated, at one side, by the point 64 of the die 63 and then the diametrically opposed parts of the wall of tube 59 are forced upwardly and downwardly, respectively, against the surface of cavity 20 to form the parts 60 and 61 of the seat. Although the parts 60 and 61 of the seat each have a single wall thickness, the modification of FIGS. 18, 19 and 20 encloses the tube 62 at the joint of the latter with the preformed tube 59.

Although the tube 59 is pierced by the male die 63 at both sides of the tube, it is possible, in accordance with the present invention, to pierce the wall of the tube only at one side of the latter. Thus, as shown on FIGS. 21, 22 and 23, which represent the application of the invention to the forming of a T-shaped joint for a bicycle handle bar, the tube or handle bar 79 is formed with a seat 80 extending around an opening punched in the bottom of the tube 79 and which corresponds to the cross-section of the tube 81 on which the tube 79 is to be mounted. The seat 80 and the opening only at the bottom of the tube 79 may be formed in the latter with the die arrangement of FIG. 17 by limiting the stroke of the male die 63 so that the latter will penetrate only one side of the tube 79. Further, the part 82 of the tube 79 at the side of the seat 80 remote from the opening around which the seat extends can be pressed flat and formed with a relatively small opening 83 for receiving the expanding bolt 84 of the usual bicycle handle bar assembly. Thus, the flat surface portion 82 forms a seat for the washer 85 which is interposed between the head 86 of the bolt 84 and the handle bar or tube 79. The upper end of the tube 81 extending into tube 79 may be tapered, as shown on FIGS. 22 and 23, so that the end edge of the tube 81 may extend up to, and bear against the flat wall part 82 of tube 79.

When the formed tube 79 is removed from the die arrangement of FIG. 17, it will be seen that the edges around the opening formed in the tube are doubled over, as shown on FIG. 23, thereby providing a reinforcement at the edge of the seat 80. This double thickness of material is accommodated in the die arrangement by suitably dimensioning the bore 20. After the tube 81 has been inserted in the seat 80 of tube 79, the tubes can be secured to each other by hard solder and, if necessary, the joint may be finished with soft solder in order to obtain a more attractive appearance.

Although illustrative embodiments of the invention have been described in detail herein with reference to the drawings, it is to be understood that various changes and modifications may be effected in those precise embodiments without departing from the scope or spirit of the invention, except as defined in the appended claims.

What I claim is:

1. A method for interconnecting two cylindrical intersecting rails at least one of which is tubular; comprising the steps of placing a tubular rail in a corresponding semi-cylindrical cavity of a die with both ends of said tubular rail protruding from said die, said die further having a second semi-cylindrical cavity with the centerline of the latter intersecting the centerline of the first mentioned cavity at an angle corresponding to the angle between the two rails to be interconnected, the bottom of the said second cavity, at the part thereof intersecting the first mentioned cavity, being situated lower than said first cavity, pressing a die stamp into said second cavity toward said bottom of the latter to press together wall of said tubular rail and form a double-walled part which is forced outwardly with respect to the original cross-section of the tubular rail against the inner wall of said second cavity and thereby forms a double-walled seat, removing the die stamp, then placing the other intersecting rail into the double-walled seat formed by the die stamp in the tubular rail, and securing the rails to each other in the contact area therebetween.

2. A method as in claim 1; wherein said die stamp carries at least one punch and said second cavity has a corresponding hole for each punch to perforate opposite walls of a tubular rail placed in said second cavity, and wherein the intersecting rails are secured together by adhesive means which has a good flow by reason of the perforated opposite walls of the tubular rail.

3. A method as in claim 2; wherein the long axis of said first cavity in the semi-cylindrical die is non-rectilinear.

References Cited in the file of this patent

UNITED STATES PATENTS

| | | |
|---|---|---|
| 786,847 | Seery | Apr. 11, 1905 |
| 852,636 | Simmerly | May 7, 1907 |
| 964,297 | Moore | July 12, 1910 |
| 1,250,411 | Amiot | Dec. 18, 1917 |
| 1,642,165 | McCaffrey | Sept. 13, 1927 |
| 1,994,428 | Keil | Mar. 12, 1935 |
| 2,041,199 | Miller | May 19, 1936 |
| 2,101,707 | Ewing | Dec. 7, 1937 |
| 2,143,234 | Anderson | Jan. 10, 1939 |
| 2,180,617 | Snell | Nov. 21, 1939 |
| 2,192,904 | Ferris | Mar. 12, 1940 |
| 2,241,871 | Tench | May 13, 1941 |
| 2,354,860 | Hartsock et al. | Aug. 1, 1944 |
| 2,461,003 | Schwinn | Feb. 8, 1949 |
| 2,632,511 | Hamilton | Mar. 24, 1953 |
| 2,673,390 | Broberg | Mar. 30, 1954 |
| 2,699,348 | Fulop | Jan. 11, 1955 |
| 2,732,618 | Schwinn | Jan. 31, 1956 |

FOREIGN PATENTS

| | | |
|---|---|---|
| 4,787 | Great Britain | 1878 |
| 651,925 | Great Britain | Apr. 11, 1951 |
| 14,275 | Switzerland | May 3, 1897 |
| 44,408 | Switzerland | Oct. 28, 1916 |